United States Patent
Morris

[11] Patent Number: 6,150,778
[45] Date of Patent: Nov. 21, 2000

[54] SENSORLESS ROTOR POSITION DETECTION FOR SWITCHED RELUCTANCE MACHINES HAVING IRREGULAR POLES

[75] Inventor: David J. Morris, Novelty, Ohio

[73] Assignee: Tridelta Industries, Inc., Mentor, Ohio

[21] Appl. No.: 09/257,867

[22] Filed: Feb. 25, 1999

Related U.S. Application Data

[60] Provisional application No. 60/107,061, Nov. 4, 1998.

[51] Int. Cl.$^7$ ........................................... H02P 6/18
[52] U.S. Cl. ..................... 318/254; 318/701; 318/721; 318/724
[58] Field of Search .................... 318/138, 254, 318/439, 700, 701, 720, 721, 722, 724; 310/254, 261, 68 R, 68 B

[56] References Cited

U.S. PATENT DOCUMENTS

| | | | |
|---|---|---|---|
| Re. 35,189 | 3/1996 | Müller | 318/254 |
| 3,742,330 | 6/1973 | Hodges et al. | 321/9 A |
| 4,074,179 | 2/1978 | Kuo et al. | 318/696 |
| 4,127,801 | 11/1978 | Leenhouts | 318/696 |
| 4,208,623 | 6/1980 | Leenhouts | 318/696 |
| 4,295,083 | 10/1981 | Leenhouts | 318/696 |
| 4,430,603 | 2/1984 | Muller | 318/254 |
| 4,496,886 | 1/1985 | Gordon et al. | 318/254 |
| 4,500,824 | 2/1985 | Miller | 318/701 |
| 4,501,997 | 2/1985 | Muller | 318/254 |
| 4,531,079 | 7/1985 | Muller | 318/254 |
| 4,570,212 | 2/1986 | Edwards et al. | 363/138 |
| 4,620,138 | 10/1986 | Müller | 318/254 |
| 4,763,056 | 8/1988 | Byrne et al. | 318/701 |
| 4,783,795 | 11/1988 | Yahata | 378/105 |
| 5,084,662 | 1/1992 | Palaniappan et al. | 318/254 |
| 5,144,215 | 9/1992 | Bahn | 318/701 |
| 5,159,246 | 10/1992 | Ueki | 318/254 |
| 5,256,923 | 10/1993 | Bartos et al. | 310/166 |
| 5,446,359 | 8/1995 | Horst | 318/701 |
| 5,530,333 | 6/1996 | Turner | 318/701 |
| 5,552,682 | 9/1996 | Ushikoshi | 318/254 |
| 5,589,752 | 12/1996 | Iwasaki et al. | 318/701 |
| 5,654,600 | 8/1997 | Nomura et al. | 310/68 B |
| 5,736,846 | 4/1998 | Floru et al. | 324/127 |
| 5,841,621 | 11/1998 | Dean et al. | 361/185 |

FOREIGN PATENT DOCUMENTS

| | | | |
|---|---|---|---|
| 0 288 759 | 11/1988 | European Pat. Off. . | |
| 797047 | 1/1981 | Russian Federation | H02P 7/36 |
| 2 208 456 | 3/1989 | United Kingdom | H02P 6/028 |
| 97/15108 | 4/1997 | WIPO . | |

OTHER PUBLICATIONS

"Saturation in doubly salient reluctance motors", by J.M. Stephenson and M.A. El–Khazendar, *IEE Proceedings*, vol. 136, pp. 50–58, Jan. 1989.

"Power converter circuits for switched reluctance motors with the minimum number of switches", by C. Pollock and Prof. B.W. Williams, *IEE Proceedings*, vol. 137, pp. 373–384, Nov. 1990.

"Computer Aided Design of Electrical Machines for Variable Speed Applications", by R. Krishnan, S. Aravind and P. Materu, *IECON '87*, pp. 756–763, 1987.

"Dynamic Operation", by T.J.E. Miller, Switched Reluctance Motors and their Control, pp. 53–70, 1993, Magna Physics Publishing and Clarendon Press, Oxford.

"Power Electronic Controller", by T.J.E. Miller, Switched Reluctance Motors and their Control, pp. 85–97, 1993, Magna Physics Publishing and Clarendon Press, Oxford.

*Primary Examiner*—Bentsu Ro
*Attorney, Agent, or Firm*—Arter & Hadden LLP

[57] ABSTRACT

A system for detecting the position of a rotor for a switched reluctance (SR) machine having an irregular pole configuration. The system does not require the use of a conventional sensing device, and provides accurate position information, without disrupting operation of the machine. A voltage ratio is used to infer the position of the rotor relative to the stator.

49 Claims, 9 Drawing Sheets

SENSORLESS ROTOR POSITION DETECTION FOR SWITCHED RELUCTANCE MACHINES HAVING IRREGULAR POLES

RELATED APPLICATIONS

The present application claims the benefit of U.S. Provisional Application No. 60/107,061 filed Nov. 4, 1998.

FIELD OF INVENTION

The present invention relates generally to a system for detecting rotor position, and more particularly relates to a system for detecting the rotor position in a switched reluctance (SR) machine having at least one irregular pole, without the use of a sensing device.

BACKGROUND OF THE INVENTION

A switched reluctance (SR) motor is a doubly salient variable reluctance motor. A coil, wound around each stator pole, is connected with at least one other coil on another stator pole, to form a phase winding. The reluctance of the flux path between a pair of stator poles varies as a respective pair of rotor poles rotates into and out of alignment with them. Because inductance is inversely proportional to reluctance, the inductance of a phase winding is at a maximum when the rotor is in the aligned position and at a minimum when the rotor is in the unaligned position.

Positive torque (i.e., "motoring torque") is produced if current flows in a phase winding as the inductance of that phase winding is increasing. A negative torque (i.e., "generating torque") contribution is avoided if the current is reduced to zero before the inductance begins to decrease again. Therefore, in a motoring operation, each phase is usually excited when its inductance is increasing, and is unexcited when its inductance is decreasing. In the case of a generating operation, the opposite is true. The rotor speed can be varied by changing the frequency of the phase current pulses while maintaining synchronism with the rotor position.

It is usually necessary to determine the angular position of the rotor relative to the stator, so that appropriate phase commutation (motor control operations) can be taken to properly and efficiently operate the motor. Some prior art systems for determining rotor position have relied upon the use of position sensing devices, which add substantial manufacturing costs to the motor. For instance, a hall effect sensor, a resolver or an encoder is located on the shaft of the motor. It is further noted that prior art position sensing devices may not be suitable for use in certain applications due to environmental considerations. For example, in an automotive application, the position sensing device may not function properly due the effects of dust, dirt and grime on the position sensing device. Alternatively, self inductance of a phase winding can be used to infer rotor position. Some prior art systems for sensorless rotor position detection have required the injection of currents into the phase winding. The rise time of the current in the phase winding is used to determine rotor position. This technique is disruptive of motor operations, and does not yield accurate position data. Accordingly, there is a need for a system for determining rotor position, which is inexpensive to manufacture, suitable for use in a wide variety of applications, including those in harsh environments, does not disrupt motor operations, and provides accurate position information.

SUMMARY OF THE INVENTION

According to the present invention there is provided a method for detecting the position of a rotor pole relative to the position of a stator pole, in a switched reluctance (SR) machine having at least one irregular pole configuration, comprising the steps of: sensing a first voltage across a first coil set of a first phase winding, comparing said first voltage to at least one reference voltage to generate a position output signal, indicative of a known rotor position, and generating an encoder output signal in accordance with said position output signal to control excitation of the first phase winding.

In accordance with another aspect of the present invention there is provided a system for detecting the position of a rotor pole relative to the position of a stator pole, in a switched reluctance (SR) machine having at least one irregular pole, said system comprising: sensing means for sensing a first voltage across a first coil set of a first phase winding, comparison means for comparing said first voltage to at least one reference voltage to generate a position output signal, indicative of a known rotor position, and means for generating an encoder output signal in accordance with said position output signal to control excitation of the first phase winding.

An advantage of the present invention is the provision of a system for detecting rotor position which does not require the use of a conventional sensing device.

Another advantage of the present invention is the provision of a system for detecting rotor position which yields accurate ratiometric position data that is insensitive to supply voltage, differences in inductance caused by manufacturing variations (e.g., small differences in air gaps), etc.

Still another advantage of the present invention is the provision of a system for detecting rotor position which does not disrupt or interfere with machine operations.

Yet another advantage of the present invention is the provision of a system for detecting rotor position which lowers manufacturing costs (e.g., by minimizing wiring).

Yet another advantage of the present invention is the provision of a system for detecting rotor position which is easy to implement and manufacture.

Yet another advantage of the present invention is the provision of a system for detecting rotor position which is suitable for use in a wide variety of applications, including those in harsh environments.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
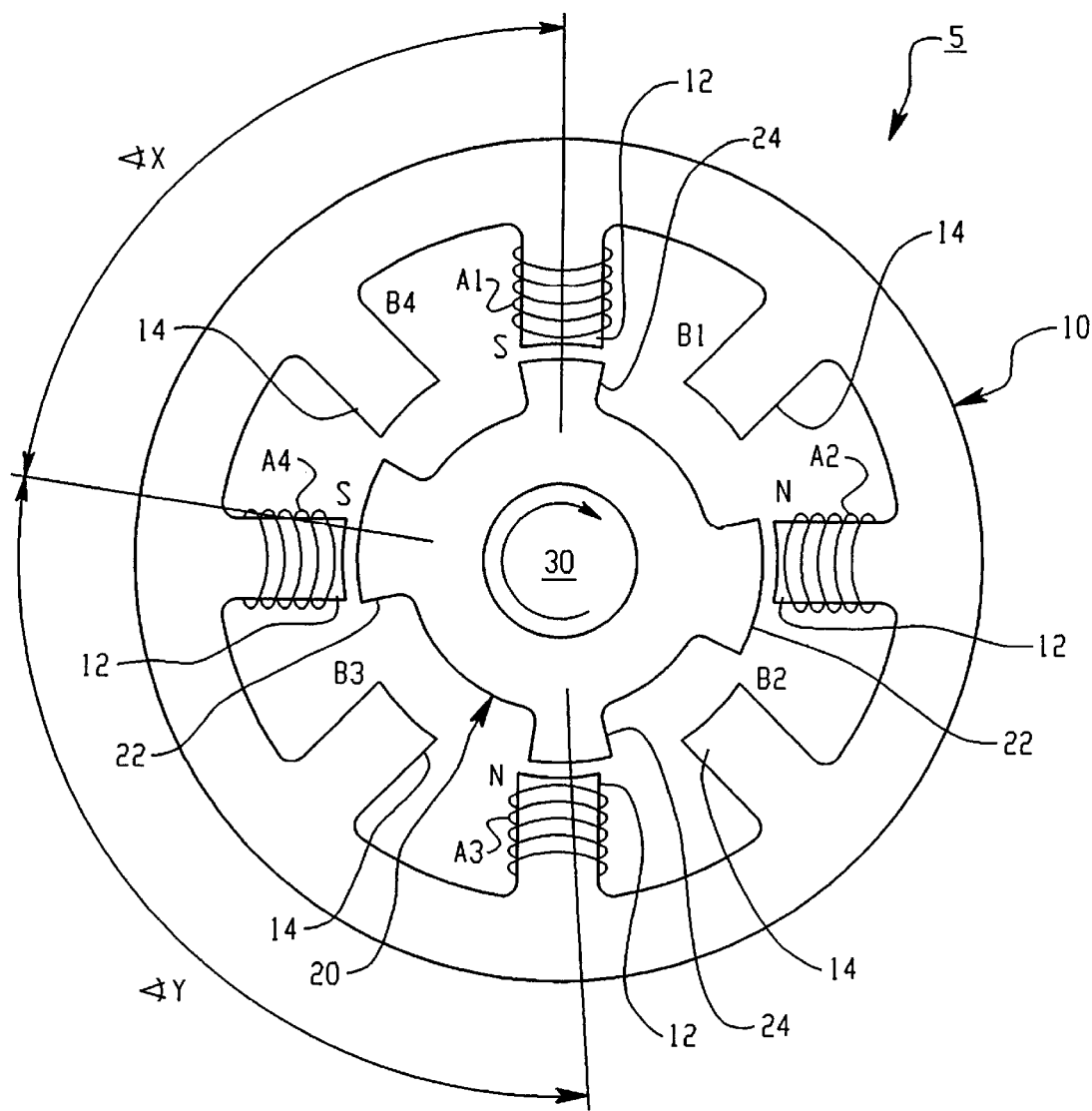
FIG. 1 illustrates an exemplary 2-phase SR machine having an irregular pole configuration.

Referring now to the drawings wherein the showings are for the purposes of illustrating a preferred embodiment of the invention only and not for purposes of limiting same, FIG. 1 shows an exemplary SR motor 5 having stator coils (i.e., windings). These windings may be arranged in either series, parallel or combinations thereof (e.g., for higher multiplicity motors).

It should be appreciated that the term "switched reluctance," as used herein, is also intended to include "variable reluctance" and "synchronous reluctance." Furthermore, while the present invention is described with particular reference to a switched reluctance motor, the concepts embodied in the present invention are equally applicable to a switched reluctance generator.

Moreover, it should be understood that the SR machines described herein are shown solely for the purpose of illustrating the present invention. In this regard, the present invention is suitable for use in connection with SR machines having other types of irregular-shaped pole configurations. It will be understood that the term "irregular-shaped pole configuration" refers herein to a pole configuration wherein at least one rotor pole or stator pole has a physical geometric characteristic (e.g. dimension, size, shape, width/pole arc, etc.) that differs from a physical geometric characteristic of one or more other rotor pole or stator teeth. Consequently, there is provided a coil or coils which have a unique inductance as a function of rotor position. This property allows for the generation of accurate ratiometric determination of rotor position. The unique inductance results from having a different "air gap" between rotor and stator at strategic rotor positions. It will be understood that poles having different widths (e.g., a pair of narrow poles and a pair of wide poles) and/or steps will cause the coils to "see" different sized air gaps, as the rotor rotates. Furthermore, it is noted that even small irregularities, e.g., slightly different rotor arcs, may cause one tooth pair to overlap "prematurely," which results in a detectable signal from the voltage divider principle. It should be noted that in cases where there are multiple occurrences of a particular inductance, the ambiguity may be resolved by obtaining information from one or more other phases.

It should be further appreciated that other properties, such as permeability, can also be utilized to obtain a unique inductance profile at a given rotor position. Therefore, the term "irregular pole configurations" not only refers to poles with an irregular-shaped pole configuration (as discussed above), but also refers to poles having irregularities in material properties, such as permeability. These irregular pole configurations among rotor poles and stator poles can be utilized to obtain rotor position information in accordance with the present invention.

SR Motor 5 is generally comprised of a stator 10 and a rotor 20, which is mounted to a shaft 30. Stator 10 includes stator pole sets 12 and 14. Stator pole set 12 corresponds to a first phase ("phase A"), while stator pole set 14 corresponds to a second phase ("phase B"). Rotor 20 includes a first pair of rotor poles 22, and a second pair of rotor poles 24. It should be noted that rotor poles 22 and 24 have different polar arc dimensions, in terms of both width and position.

Each stator pole 12 and 14 is surrounded by a winding of one or more turns of electrically conductive material and appropriate insulation. Stator poles 12 are associated with "phase A" windings, while stator poles 14 are associated with "phase B" windings. It should be noted that for the purpose of clarity, the windings for stator poles 14 are not shown.

Figure 2A:
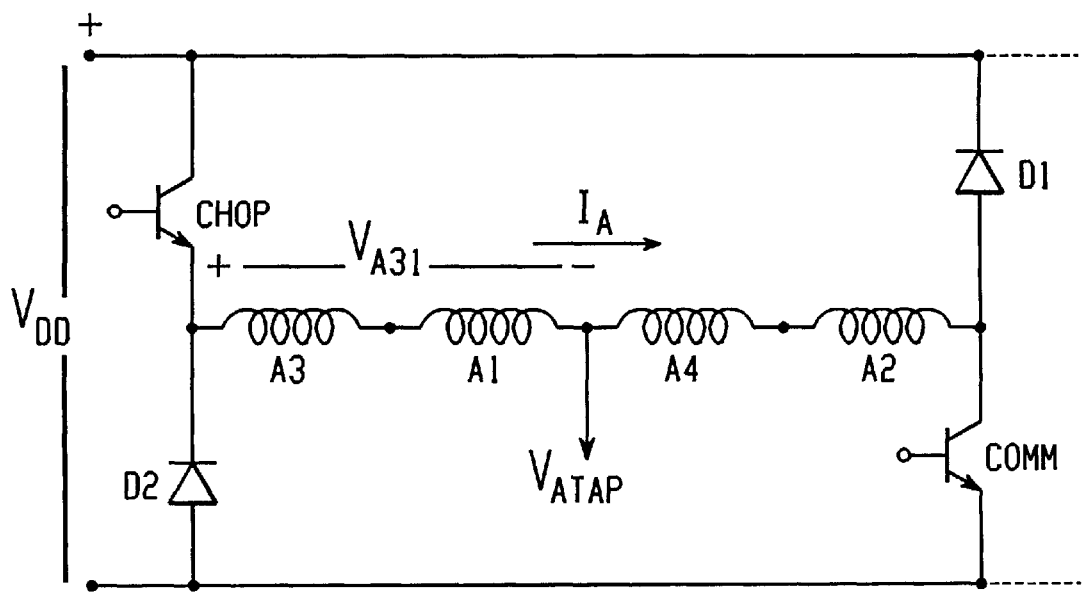
FIG. 2A is a schematic of a conventional asymmetric half-bridge controller circuit arrangement, wherein the coils of the phase winding are in series.
Figure 2B:
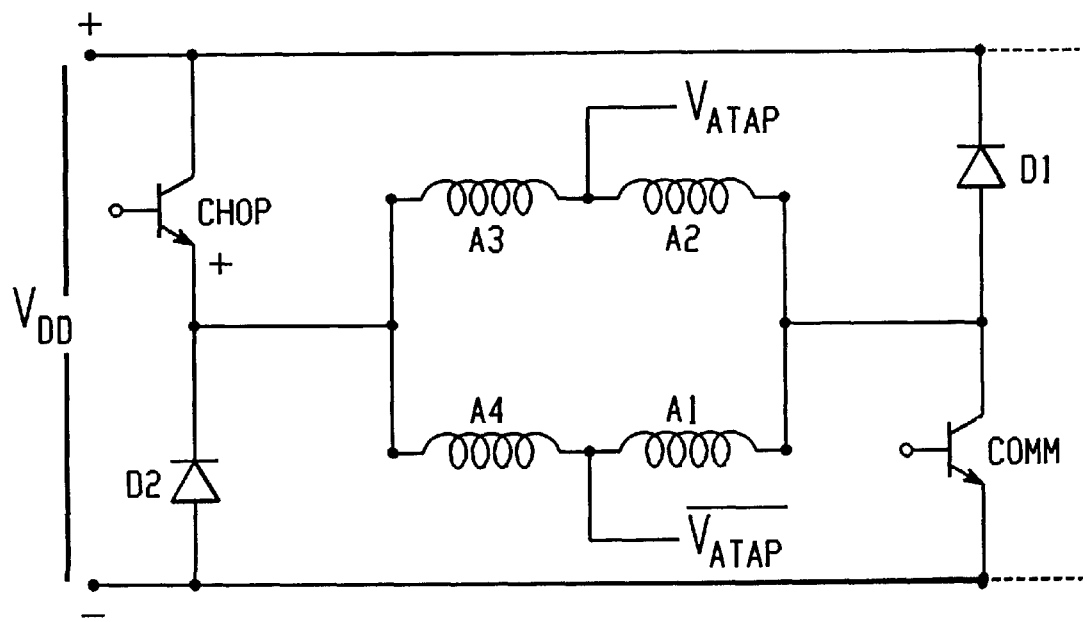
FIG. 2B is a schematic of a conventional asymmetric half-bridge controller circuit arrangement, wherein the coils of the phase winding are in series/parallel.

In accordance with an exemplary embodiment of the present invention, coils A3 and A1 form a first pair of series-connected windings for phase A, while coils A4 and A2 form a second pair of series-connected windings for phase A. Collectively, coils A1, A2, A3 and A4 are referred to as the "phase A windings." FIG. 2A illustrates a conventional asymmetric half-bridge controller circuit arrangement, wherein the coils of the phase A winding are in series. Similarly, FIG. 2B illustrates a conventional asymmetric half-bridge controller circuit arrangement, wherein the coils of the phase A winding are in a series/parallel combination. While the present invention will be further described in connection with the circuit arrangement shown in FIG. 2A, the present invention is applicable to the "series/parallel" circuit arrangement shown in FIG. 2B, as well as other controller circuit arrangements not illustrated herein. It should be appreciated that a series/parallel arrangement may be preferred for high speed motors, since the inductance is lower, while a series arrangement may be preferred for low speed motors. Although, a series arrangement could also be scaled by the number of turns, to reduce the inductance.

Coils B1, B2 and B3, B4 (not shown) located on stator poles 14, respectively form the first and second pair of windings for the second phase (i.e., phase B). Collectively, coils B1, B2 and B3 and B4 are referred to as the "phase B windings". It should be understood that the conventional asymmetric half-bridge controller circuit arrangements shown in FIG. 2A and 2B also include circuitry for phase B windings (not shown) that is analogous to the circuitry for the phase A windings.

The phase A and phase B windings are alternately disposed on every other stator pole and are wound such that for every pole of one polarity there is a corresponding pole of an opposite polarity. Accordingly, the stator poles 12 associated with coils A1 and A2 have opposite polarity, while the stator poles 12 associated with coils A3 and A4 have opposite polarity. The stator poles 14 associated with coils B1, B2, B3 and B4 are likewise arranged.

Rotor poles 22,24 are disposed unevenly about the circumference of rotor 20. In this regard, the angle X between rotor poles is not equal to the angle Y between rotor poles. Moreover, the faces of wide rotor poles 22 span an angle greater than the faces of the narrow rotor poles 24. In the exemplary embodiment shown in FIG. 1, at the circumference of rotor 20, the face of wide rotor poles 22 are approximately twice as wide as the face of the narrow rotor poles 24. At the inside circumference of the stator, the face of the stator poles 12, 14 are approximately the same width as the face of the narrow rotor poles 24 and the distance between adjacent stator poles 12, 14 is approximately the width of a stator pole.

The phase A and phase B windings are grouped together so that a uniform balanced torque is produced in the motor when the windings are excited from an external source of electrical energy and also so that voltage and current requirements of the external energy source are satisfied. A variation in reluctance (and likewise inductance) of all phase A windings occurs when rotor 20 is rotated with respect to stationary stator poles 12 and 14. The variation in reluctance (and likewise inductance) is the result of the variation in the size of the effective net air gap between the stator pole and the rotor pole of all the phase A windings.

Torque in an SR motor is related to changing inductance of energized phase windings as a function of rotor position ($dL/d\theta$). Inductance in an SR motor increases or decreases as the poles of the rotor move into or out-of alignment with the poles associated with the energized stator windings, i.e., as the rotor-stator system moves in or out-of a minimum reluctance position. In other words, torque is produced when there is a change in inductance as a function of angular position, i.e., $dL/d\theta$; positive torque being produced in the regions where the inductance of an energized phase increases, and negative torque being produced in the regions where the inductance of an energized phase decreases ($-dL/d\theta$).

As is well understood by those skilled in the art, the phase A and phase B windings are selectively energized and deenergized. Energization of the respective phase windings produces a torque on rotor 20, causing rotor 20 to align rotor poles with the stator poles associated with the excited phase windings. It is to be appreciated that an increasing or decreasing inductance of a phase winding will correspond to the respective decreasing or increasing reluctance in the magnetic flux path associated with the phase winding. A detailed description of the operation of an SR motor, such as motor 5, is found in U.S. application Ser. No. 08/545,085, now U.S. Pat. No. 5,852,334, which is fully incorporated herein by reference.

Typical operation of an SR motor will now be briefly described to provide further background information; however, it does not directly form a part of the present invention per se, and thus is not intended to limit such. A positive voltage loop (PVL) typically excites phase winding inductors. In this respect, during a PVL a "positive" voltage is applied across the phase winding inductors, causing the flow of current therethrough to generally increase. Once a desired current level has been reached, a zero voltage loop (ZVL) is alternated with a PVL ("chopping mode"), in order to maintain the current in the phase winding inductors.

During a ZVL a short circuit is placed across the respective phase winding inductors. Due to system losses and converted energy, current in the respective phase winding will slowly decay. As a result, a ZVL mode is usually alternated with a PVL mode to maintain the current in the respective winding at a desired level (i.e., chopping). When it is desired to reduce or end the current flowing in the phase winding inductors, a negative voltage loop (NVL) is used. During a NVL, a "negative" voltage is applied across the phase winding inductors. This causes the current flowing therethrough to decrease. Typically, a PVL is used to begin the excitation period of a phase winding, while a NVL is used to conclude the excitation period of a phase winding.

It should be appreciated that during a PVL it is desirable to obtain a value for $V_{ATAP}$, such as through the use of a sample and hold (S/H) circuit, as will be described below. Moreover, it should be noted that $V_{ATAP}$ will be complementary (i.e., reversed polarity) during a NVL.

The switching or "excitation" of the phase windings is typically accomplished by solid state switching devices such as MOSFETS, transistors, thyristors, insulated gate bipolar transistors (IGBTs), and the like, including combinations thereof. The switching sequence of the solid state switching devices is typically determined by a "logic system" comprised of electronic circuits, that are responsive to various sensors which sense parameters such as voltage levels, current levels in the windings, the position of the rotor poles relative to the stator poles, or other signals necessary for proper operation of the motor.

Referring now to FIG. 2A, coils A3 and A1 are a first pair of series-connected windings for phase A, while coils A4 and A2 are a second pair of series-connected windings for phase A. A voltage $V_{ATAP}$ is measured across coils A4 and A2. In accordance with the inductive voltage divider principle implemented by the present invention, the sum of: (1) $V_{A31}$ (i.e., the voltage across coils A3 and A1) and (2) $V_{ATAP}$ is equal to the excitation voltage (i.e., supply voltage $V_{DD}$), neglecting voltage drops across the switches. Thus, voltage $V_{A31}$ is complementary to voltage $V_{ATAP}$. $V_{DD}$ is the bus or excitation voltage applied across the phase A winding during phase A excitation, for both PVL and NVL conditions.

The ratio of the inductances between coils A3, A1 and coils A4, A2 gives rise to a proportioning of the applied excitation voltage ($V_{DD}$), as well as any generated back-EMF. By sampling the voltage $V_{ATAP}$ across coils A4 and A2, and comparing it to the simultaneous voltage $V_{A31}$ across coils A3, A1, the position of the rotor can be inferred. In addition, the position of the rotor can be inferred by making a "single-ended" comparison to a reference voltage derived from the supply voltage $V_{DD}$. In this regard, voltage $V_{ATAP}$ may be compared to a value proportional to $V_{DD}$, as will be described in further detail below.

Figure 3:
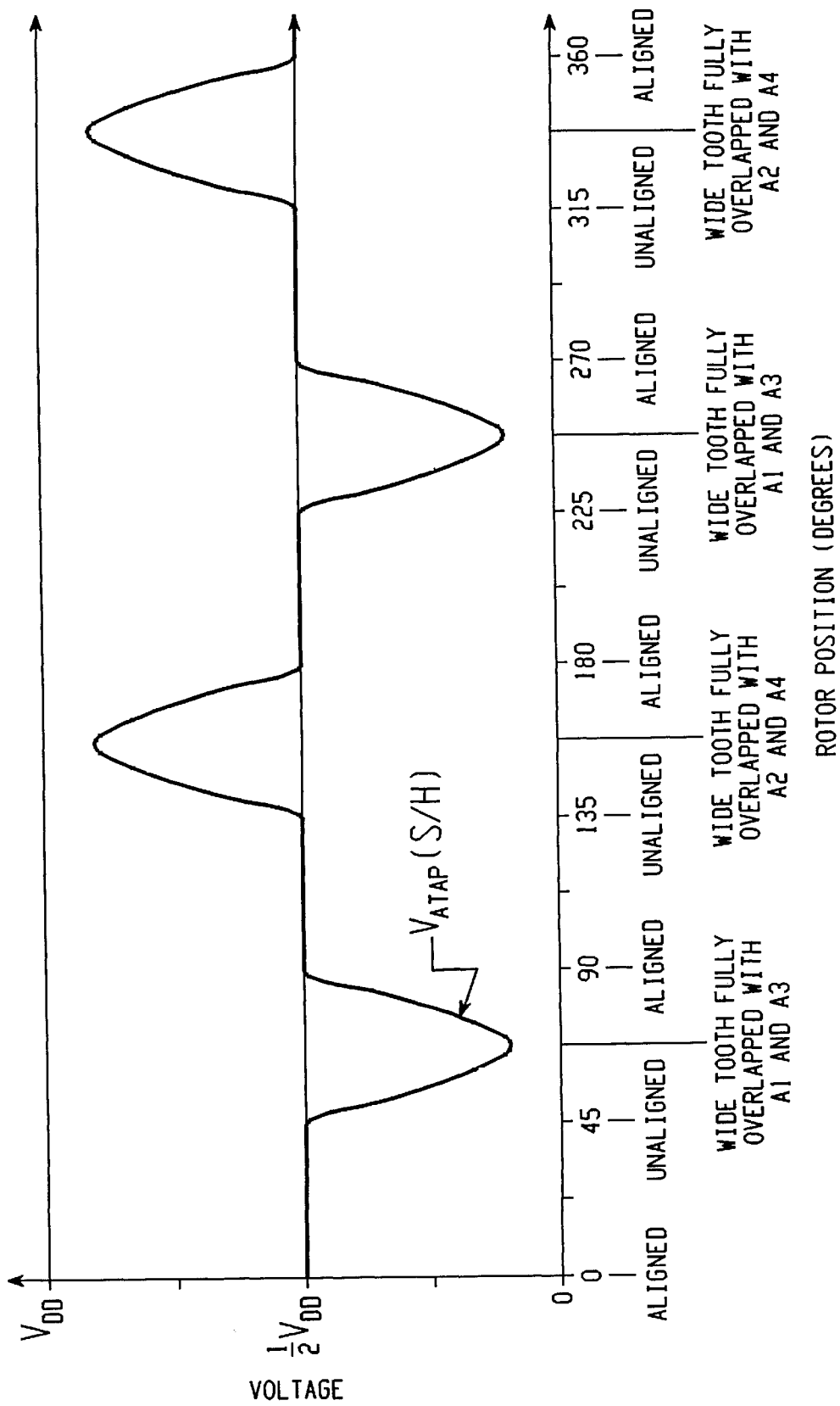
FIG. 3 is a waveform illustrating an "ideal" sample and hold (S/H) circuit output for $V_{ATAP}$, versus rotor position, for the controller circuit arrangement shown in FIG. 2A.

Referring now to FIG. 3, there is shown an "ideal" voltage waveform illustrating a sample and hold (S/H) circuit output for $V_{ATAP}$, which will be referred to herein as $V_{ATAP}$ (S/H). This voltage waveform illustrates $V_{ATAP}$ (S/H), as the rotor moves 360 degrees, alternating between (1) an "aligned" position, wherein all 4 phase A stator poles are fully aligned with a respective rotor pole, and (2) an "unaligned" position, wherein all 4 phase A stator poles are fully unaligned with a respective rotor pole. It will be appreciated that in practice the sample and hold circuit will "hold" the voltage between 0 degrees and 45 degrees; 90 degrees and 135 degrees; 180 degrees and 225 degrees; and 270 degrees and 315 degrees, because phase A is not typically excited during these intervals. Operation of the sample and hold circuit will be provided in detail below.

At the zero degree position shown in FIG. 1, all 4 phase A stator poles are fully aligned with a respective rotor pole. Consequently, the voltage $V_{ATAP}$ is equal to voltage $V_{A31}$, which is approximately $0.5V_{DD}$. Likewise, when all 4 phase A stator poles are fully unaligned with a respective rotor pole (e.g., at 45 degrees), voltage $V_{ATAP}$ is again equal to voltage $V_{A31}$. Moreover, voltage $V_{ATAP}$ (S/H) remains equal to voltage $V_{A31}$ between the aligned position at zero degrees and the unaligned position at 45 degrees, because of the "holding" operation of the sample and hold circuit described below. When the rotor moves past the approximate 45 degree position, coils A3, A1 will see a different amount of iron than coils A4 and A2. As a result, the amount of inductance resulting in coils A3 and A1 will differ from the amount of inductance resulting in coils A4 and A2. Since $V=Ldi/dt$, and L changes while di/dt is common to all coils within a phase, the voltage $V_{A31}$ measured across coils A3 and A1 will begin increasing as they approach full alignment. Simultaneously, the voltage $V_{ATAP}$ will begin decreasing. However, the sum of $V_{A31}$ and $V_{ATAP}$ still equal $V_{DD}$. Therefore, $V_{ATAP}$ is observed to decline to approximately 0.15 of $V_{DD}$ when coils A3 and A1 are fully overlapped with the "wide teeth" at 67.5 degrees. From 67.5 degrees to 90 degrees, $V_{ATAP}$ is observed to increase, while $V_{A31}$ is observed to decrease. In this regard, coils A3 and A1 remain aligned, while coils A4 and A2 move to full alignment. From 90 degrees to 135 degrees, $V_{ATAP}$ (S/H) will remain unchanged due to the "holding" operation of the sample and hold circuit described below. Consequently, $V_{ATAP}$ (S/H) is observed to remain equal to voltage $V_{A31}$, which is approximately $0.5 V_{DD}$. When the rotor moves past the approximate 135 degree position, coils A4 and A2 will see a different amount of iron than coils A3 and A1. As a result, the amount of inductance resulting in coils A4 and A2 will increase as coils A4 and A2 move to a fully overlapped position with the "wide teeth" at approximately 157.5 degrees. As a result, the voltage $V_{ATAP}$ measured across coils A4 and A2 will begin increasing as they approach the fully overlapped position. Simultaneously, the voltage $V_{A31}$ will begin decreasing. $V_{ATAP}$ is observed to increase to approximately 0.85 of $V_{DD}$ when coils A4 and A2 are fully overlapped at 157.5 degrees. From 157.5 degrees to 180 degrees, $V_{ATAP}$ is observed to decrease, while $V_{A31}$ is observed to increase. A similar pattern continues for the remaining 180 degrees, as shown in FIG. 3. Regardless of the relative positions of the stator poles and rotor poles, the sum of $V_{A31}$ and $V_{ATAP}$ will be equal to the excitation voltage $V_{DD}$. It should be appreciated that the values of $0.15 V_{DD}$ and $0.85 V_{DD}$ observed in FIG. 3 are only exemplary values, and that such "min" and "max" values are a function of the inductance ratio of the particular motor.

To determine actual rotor position, an analog voltage ratio is determined. By "mapping" the voltage ratio versus rotor position (for one or more phases), the actual rotor position can be "looked up" or indexed into a look-up table of rotor position data, using the computed voltage ratio. In addition, a single voltage threshold can be identified and used to generate position strobes. It will be appreciated that the ratiometric data provides measured position data which is, in principle, insensitive to supply voltage, winding temperature, nominal inductance, and other operating conditions. It should be appreciated that the system of rotor position detection embodied in the present invention does not disturb normal motor operations. In this regard, the present invention does not require a rise in currents to obtain position information, since voltages are used to derive position information.

If additional position data is desired, the voltages across the phase B winding (i.e., coils B1, B2, B3 and B4) can likewise be sensed. This may be desirable in situations where faster sampling rates are needed to collect data for accurately tracking the rotor position. It should be understood that the high torque to inertia ratios of SR motors makes this aspect of faster sampling important.

It should be appreciated that while the present invention has been described with reference to circuitry measuring a voltage across coils A4 and A2 of the phase A windings, the voltage across other coils of other phases may be measured to determine rotor position, in accordance with concepts embodied by the present invention.

Figure 4A:
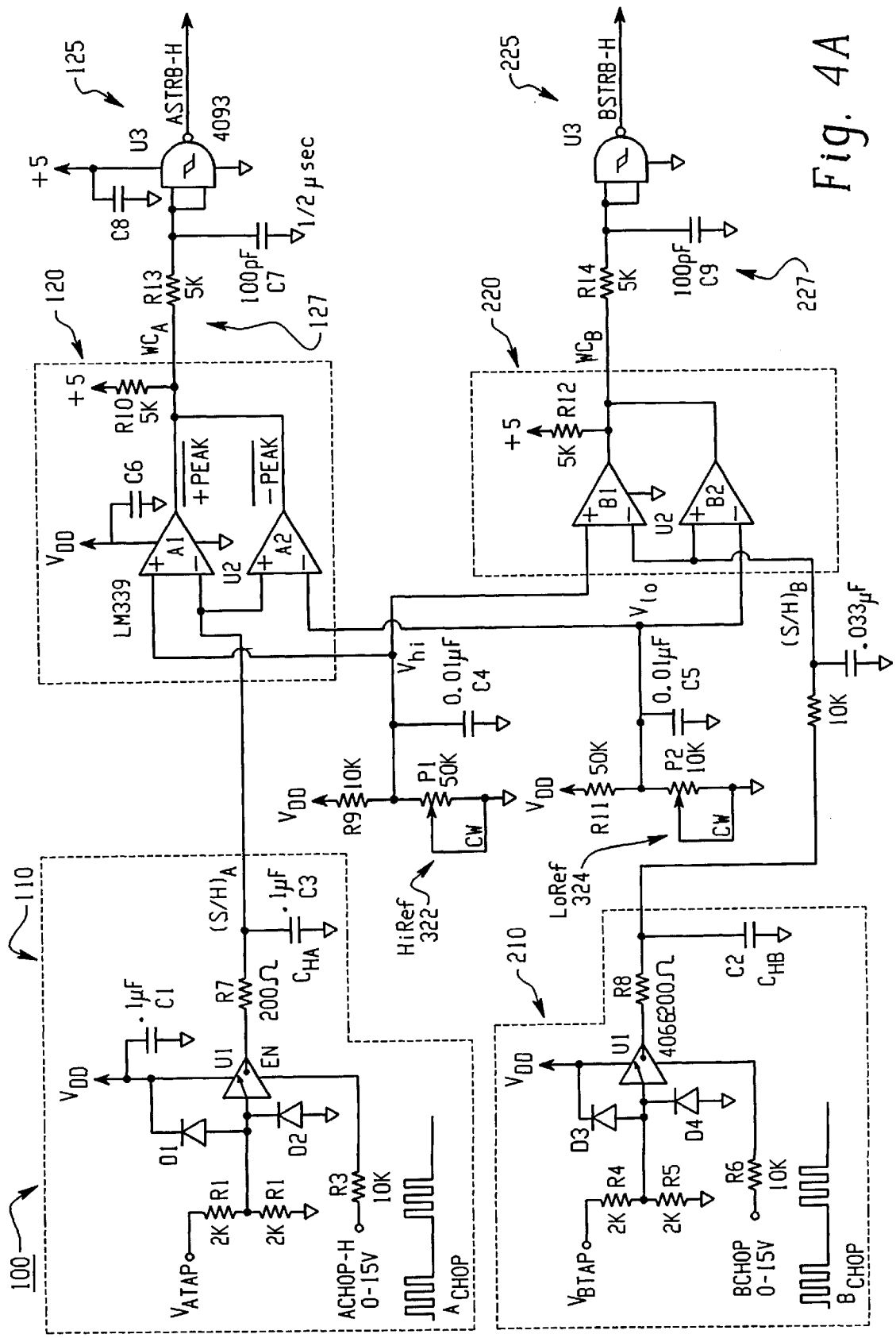
FIG. 4A and 4B are schematic diagrams of a position detection circuit in accordance with a preferred embodiment of the present invention.
Figure 4B:
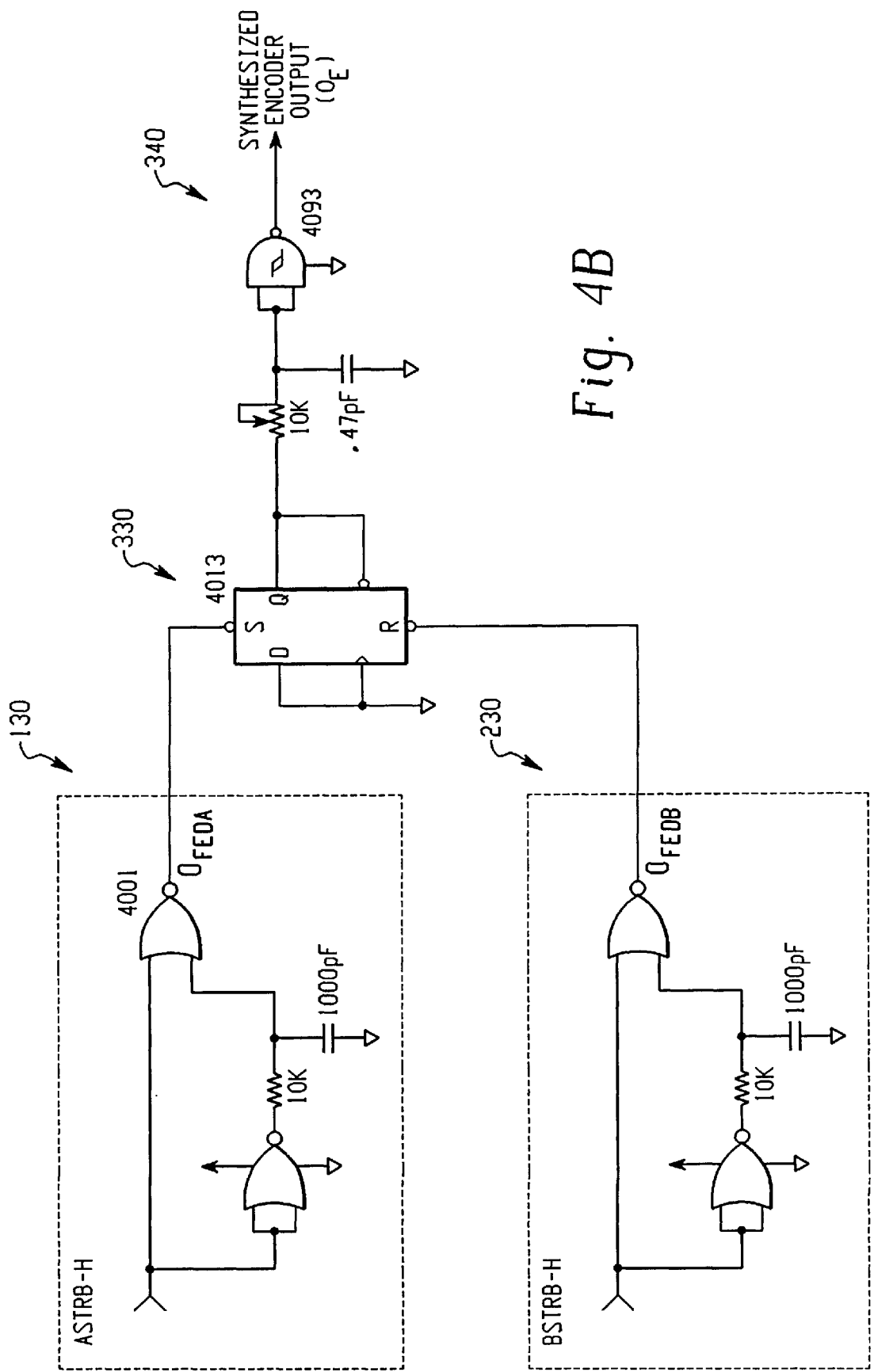
Figure 4C:
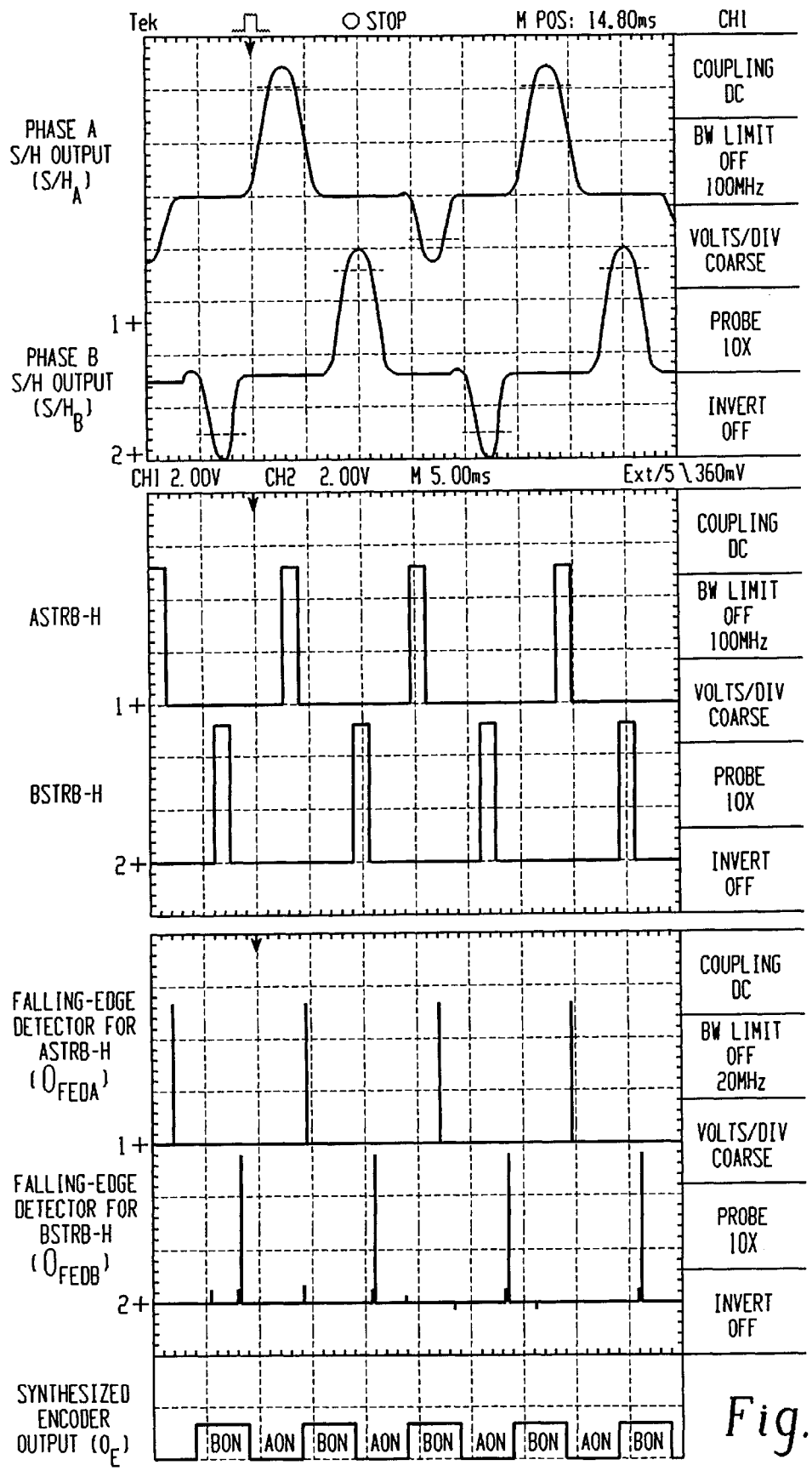
FIG. 4C is a waveform diagram illustrating various signals from the position detection circuit shown in FIGS. 4A and 4B.

Referring now to FIGS. 4A and 4B, there is shown a position detection circuit 100, according to a preferred embodiment of the present invention. FIG. 4C provides output waveforms from various stages of the position detection circuit. It will be appreciated that position detection circuit 100 shown in FIGS. 4A and 4B merely illustrates a preferred embodiment of the present invention. In this respect, position detection circuit 100 may take numerous other suitable forms, including circuit arrangements which incorporate a microprocessor and analog-to-digital (A/D) conversion circuitry.

Position detection circuit 100 includes a phase A sample and hold (S/H) circuit 110, a phase A window comparator circuit 120, a phase A inverter circuit 125, a phase A falling edge detector circuit 130, a phase B sample and hold (S/H) circuit 210, a phase B window comparator circuit 220, a phase B inverter circuit 225, a phase B falling edge detector circuit 230, a storage element 330, and a phase adjustment circuit 340.

Figure 5:
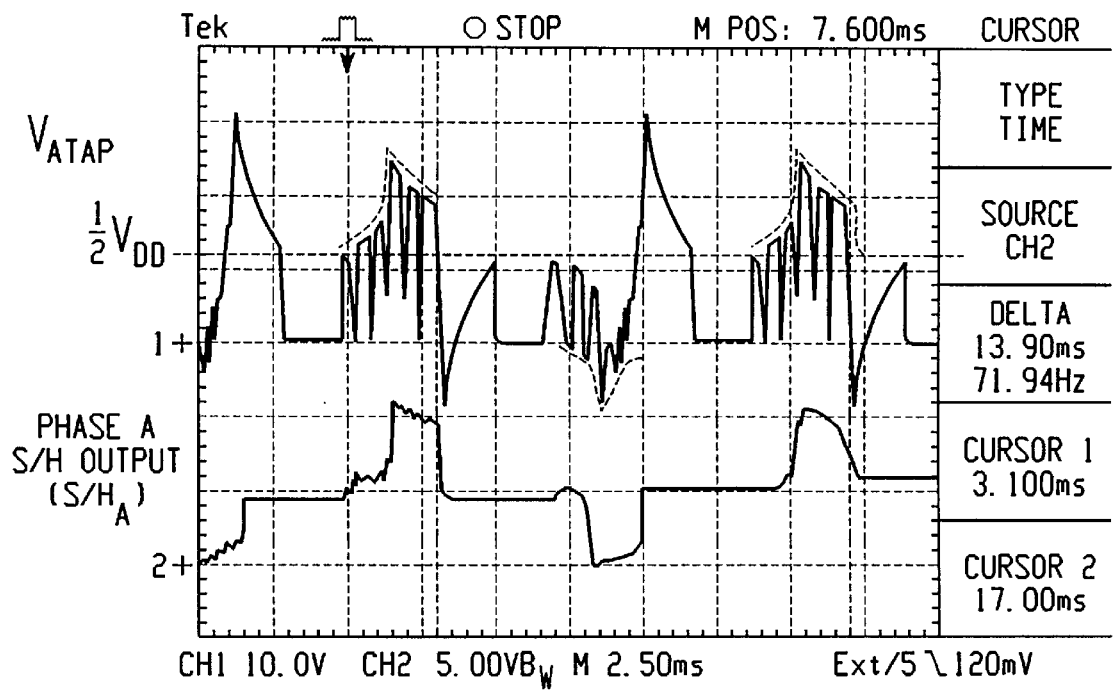
FIG. 5 is a waveform diagram illustrating sensed voltage $V_{ATAP}$ and the output of the phase A sample and hold (S/H) circuit, of the position detection circuit shown in FIG. 4A.

Position detection circuit 100 will now be described with particular reference to the phase A circuitry, it being understood that the phase B circuitry operates in a like manner. S/H circuit 110 receives $V_{ATAP}$ as an input, and samples $V_{ATAP}$ in accordance with an ACHOP input signal, which corresponds to the control signal received by the chopping switch of FIG. 2A for regulating current levels in the coils. As a result, $V_{ATAP}$ is sampled when the supply voltage $V_{DD}$ is applied across the phase A coils. A capacitor $C_{HA}$ is used to store the sampled voltage. The output signal $S/H_A$ of S/H circuit 110 and the output signal $S/H_B$ of S/H circuit 210 are shown in FIG. 4C. It should be recognized that the high frequency variation in the $V_{ATAP}$ and $V_{BTAP}$ waveform due to the effects of chopping is excluded (i.e., effectively negated) from the $V_{ATAP}$ signal by S/H circuits 110 and 210, through the use of capacitor $C_{HA}$ and the analog switch of gated amplifier U1. The effects of chopping on the $V_{ATAP}$ signal are best seen in FIG. 5, where $V_{DD}$ is 23 Volts DC, and the motor speed is approximately 2100 RPM. FIG. 5 shows the "raw" $V_{ATAP}$ voltage waveform as compared to $S/H_A$, that is output from the sample and hold circuit 110.

Window comparator circuit 120 is used to determine when the output of S/H circuit 110 crosses predetermined threshold voltages. These thresholds voltages are chosen such that the comparator circuit will indicate when $V_{ATAP}$ is near its maximum (+peak) and its minimum (−peak). In this regard, HiRef circuit 322 provides a reference voltage that is equal to approximately 80% of $V_{DD}$ while LoRef circuit 324 provides a reference voltage that is equal to approximately 20% of $V_{DD}$. It will be understood that the 20% and 80% threshold values are only exemplary. The appropriate threshold values will depend upon the inductance ratio of the motor.

Figure 6:
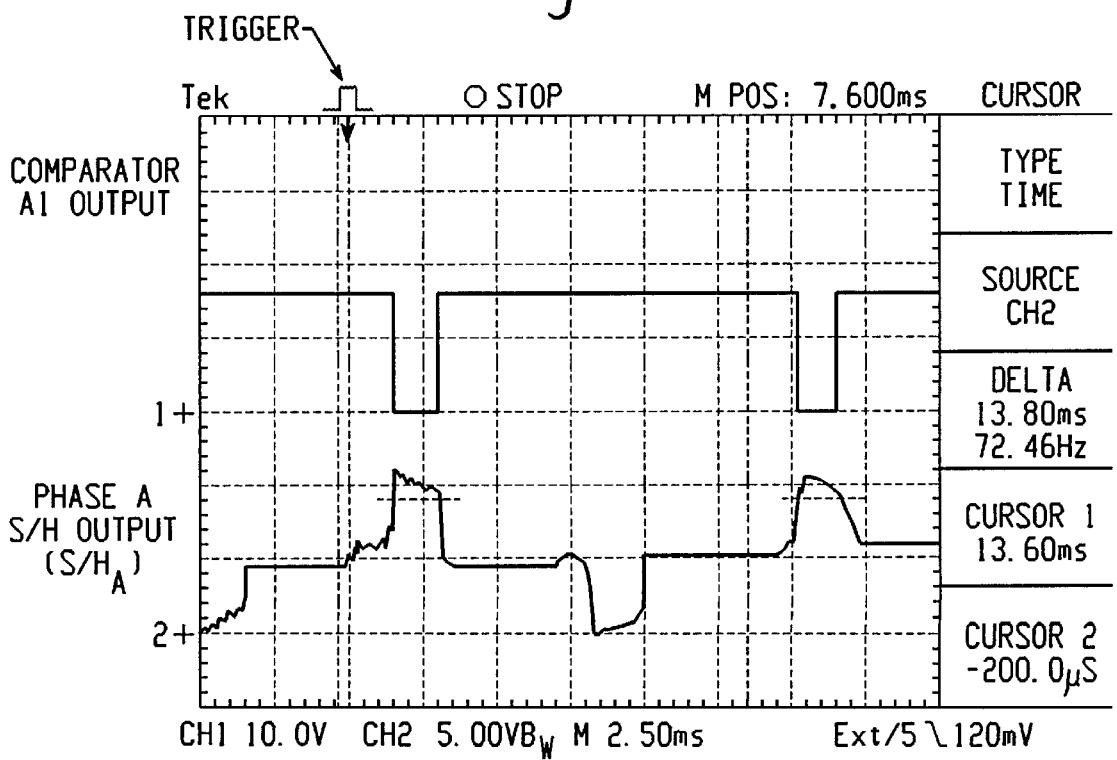
FIG. 6 is a waveform diagram illustrating the output of comparator A1 of the phase A window comparator circuit and the output of the phase A sample and hold (S/H) circuit, of the position detection circuit shown in FIG. 4A.

In the illustrated embodiment, $V_{ATAP}$ will reach a minimum when the A1 and A3 coils are fully overlapped with the wide tooth rotor poles, and $V_{ATAP}$ will reach a maximum when the A2 and A4 coils are fully overlapped with the wide tooth rotor poles (see FIG. 3). Comparator A1 of window comparator circuit 120 will generate a falling edge when $V_{ATAP}$ rises above $V_{hi}$ and will generate a rising edge when VATAP subsequently drops below $V_{hi}$. Consequently, an inverted pulse is generated when the rotor pole is spinning, wherein the pulse indicates the respective rotor position (FIG. 6). In FIG. 6 the excitation timing is approximately correct for the motor speed of approximately 2100 RPM, and $V_{DD}$ is 23 Volts DC. Similarly, comparator A2 of window comparator circuit 120 will generate a falling edge when $V_{ATAP}$ drops below $V_{lo}$ and will generate a rising edge when $V_{ATAP}$ subsequently rises above $V_{lo}$. Therefore, an inverted pulse is generated to indicate the respective rotor position.

It should be appreciated that in accordance with an alternative embodiment of the present invention, $V_{ATAP}$ or a scaled $V_{ATAP}$ can be directly fed to a comparator circuit, wherein the output of the comparator circuit is time sampled. The comparator circuit is sampled at an appropriate time to exclude the effects of chopping, and provide a digital pulse indicative of a specific rotor position. The comparator circuit is preferably used in conjunction with a microprocessor, since it provides digital data. This comparator circuit arrangement is essentially a "digital equivalent" to the "analog" sample and hold circuit discussed above.

Phase A inverter circuit 125 and phase B inverter circuit 225 respectively invert the waveform output by phase A window comparator circuit 120 and phase B window comparator circuit 220, to provide inverted signals ASTRB-H and BSTRB-H with positive-going pulses, as illustrated in FIG. 4C. A small low pass (RC) filter 127 (and 227) suppresses any high frequency erroneous transitions.

Signals ASTRB-H and BSTRB-H are respectively input to falling edge detector circuits 130 and 230. Falling edge detector circuits 130 and 230 are used to discriminate only the occurrence of a falling edge. The falling edge detector circuits 130 and 230 generate a waveform ($O_{FEDA}$ and $O_{FEDB}$) which includes a pulse at the occurrence of a falling edge (see FIG. 4C). It should be appreciated that while the present invention has been described in connection with a falling edge and a falling edge detector, other types of transitions may be implemented, including a rising edge.

The waveforms $O_{FEDA}$ and $O_{FEDB}$ are input to storage element 330, which preferably takes the form of an R-S flip flop function circuit, to generate an ON/OFF commutation signal for alternately exciting the phase A and phase B windings in accordance with the position of the rotor. In this regard, storage element 330 acts as a trigger, wherein the state of storage element 330 changes each time a pulse is received.

Figure 7A:
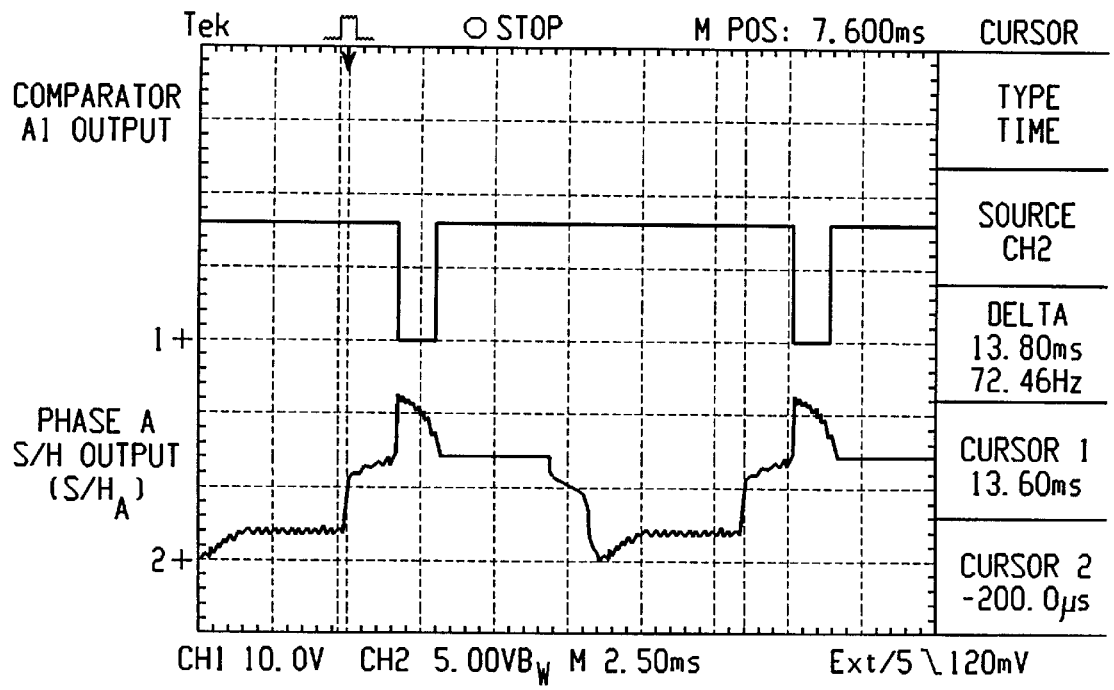
FIG. 7A is a waveform diagram illustrating the output of comparator A1 of the phase A window comparator circuit and the output of the phase A sample and hold (S/H) circuit, wherein the timing of the phase excitation pulses is too far advanced.
Figure 7B:
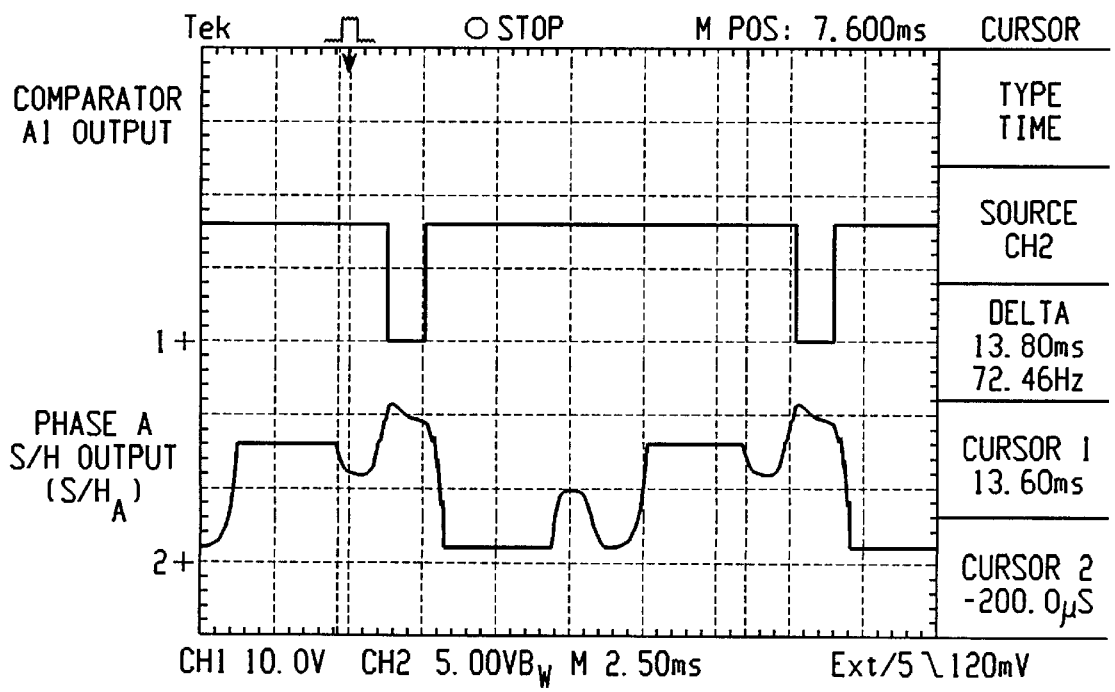
FIG. 7B is a waveform diagram illustrating the output of comparator A1 of the phase A window comparator circuit and the output of the phase A sample and hold (S/H) circuit, wherein the timing of the excitation pulses is too retarded.

A phase adjustment circuit 340 modifies the timing of the ON/OFF waveform (i.e., trigger) for a suitable period of time to provide optimum motor performance. The output of phase adjustment circuit 340 is a synthesized encoder output ($O_E$). If the adjusted timing provided by phase adjustment circuit 340 causes excitation of the phase windings to occur too far in advance (i.e., too early), an $S/H_A$ waveform similar to that shown in FIG. 7A will result. Likewise, if the adjusted timing provided by phase adjustment circuit 340 causes excitation of the phase windings to occur too late (i.e., retarded), an $S/H_A$ waveform similar to that shown in FIG. 7B will result. As can be observed from a comparison of FIGS. 6, 7A and 7B, the $S/H_A$ waveform is characteristically different for correct timing, advanced timing and retarded timing. Therefore, information about commutation relative to position can be inferred (e.g., advanced or retarded). It should be appreciated that phase adjustment circuit 340 may take other suitable forms, including a microprocessor-based arrangement.

Figure 8:
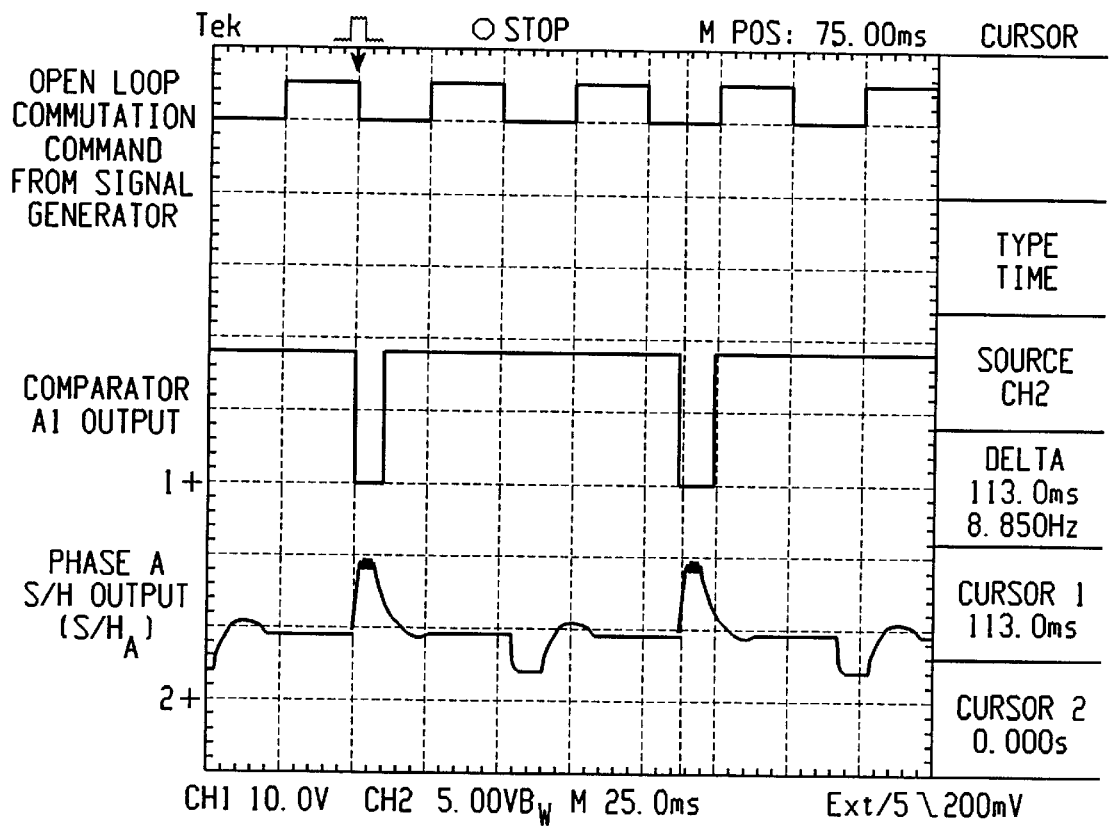
FIG. 8 is a waveform diagram illustrating the output of comparator A1 of the phase A window comparator circuit and the output of the phase A sample and hold (S/H) circuit, wherein an open loop commutation command from a signal generator provides the phase excitation pulses.

Turning now to FIG. 8, there are shown waveforms of the comparator A1 output and $S/H_A$, when the system is run "open loop" (i.e., fixed frequency) at approximately 265 RPM, with a commutation command from a signal generator. This demonstrates the utility of the position detection circuit 100 during open loop "spin-up" (start up).

Figure 9:
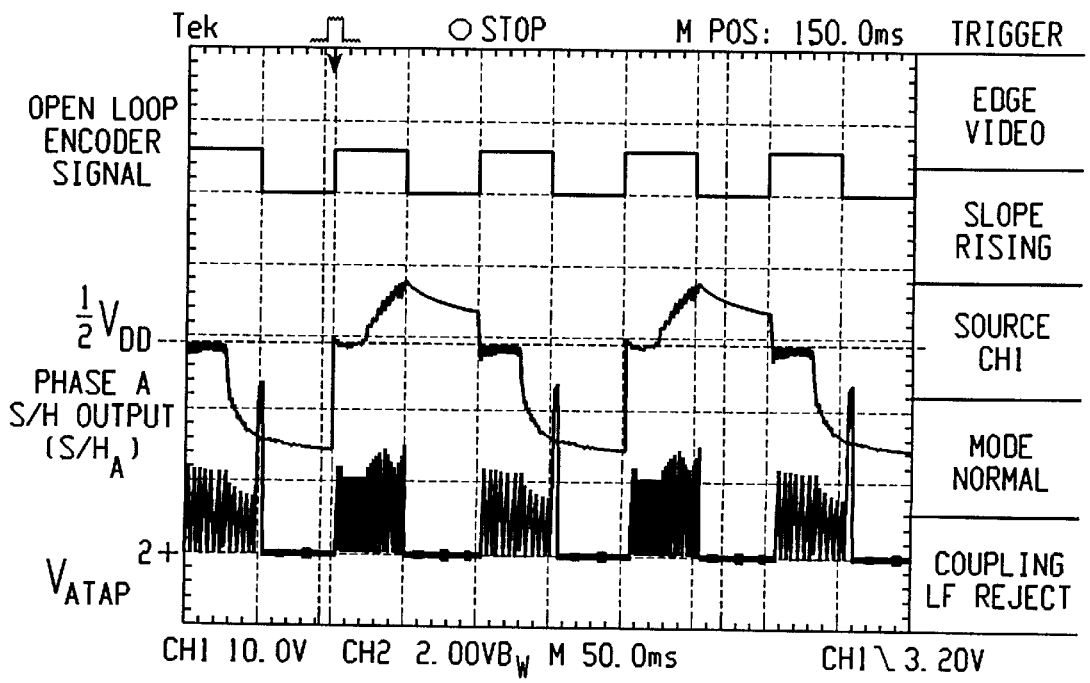
FIG. 9 is a waveform diagram illustrating the output of the phase A sample and hold (S/H) circuit, wherein the rotor is run backwards in open loop (stepper mode).

FIG. 9 shows the waveform $S/H_A$ when the motor is run open loop backwards, with a 9.8 Hz squarewave substituted for the encoder signal, as would be used to "spin-up" (start up from unknown position). As can be seen from FIG. 9, the "backward running" waveform is characteristically different from the "forward running" waveform. In this regard, it is observed that if the $S/H_A$ starts at approximately 0.5 $V_{DD}$ and subsequently shifts toward approximately 0.8 $V_{DD}$ or 0.2 $V_{DD}$, then the motor is determined to be running backwards. Accordingly, the motor direction can be discriminated, and correct orientation initiated, if desired.

As indicated above, while the present invention has been described in detail with reference to an SR motor as shown in FIG. 1, the principle embodied in the present invention are also suitably applicable to other SR machines having poles with irregular-shape or varying permeability.

The invention has been described with reference to a preferred embodiment. Obviously, modifications and alterations will occur to others upon a reading and understanding of this specification. For instance, the present invention may be alternatively implemented using parallel-connected windings, and sampling current magnitudes, rather than voltages. Furthermore, small voltages could be applied to the coils of an inactive phase to obtain additional rotor position data. Moreover, while the present invention has been described in particular detail with reference to a 2-phase SR machine, it should be understood that the present invention is also applicable to an SR machine having 3 or more phases. It is intended that all such modifications and alterations be included insofar as they come within the scope of the appended claims or the equivalents thereof.

Having thus described the invention, it is now claimed:

1. A method of position detection in a switched reluctance (SR) machine having a rotor including a plurality of rotor poles and a stator having a plurality of stator poles, wherein at least one of said rotor and/or said stator has an irregular pole configuration for at least one respective rotor and stator pole, the method comprising:

sensing a first voltage across a first coil set of a first phase winding associated with at least one of the plurality of stator poles, without introducing a test current into the first phase winding;

determining a rotor position based upon the first voltage, wherein an encoder output signal is derived in accordance with said rotor position.

2. A method according to claim 1, wherein said step of determining the rotor position includes:

sensing a second voltage across a second coil set of said first phase winding; and comparing said first voltage to said second voltage.

3. A method according to claim 1, wherein said step of determining the rotor position includes:

comparing said first voltage to a reference voltage derived from an excitation voltage for exciting the first phase winding.

4. A method according to claim 1, wherein said step of determining the rotor position includes:
   accessing a lookup table having rotor position data, in accordance with said first voltage.

5. A method according to claim 1, wherein said method further comprises:
   sensing a second voltage across a first coil set of a second phase winding; and
   determining a second rotor position based upon the second voltage.

6. A method of position detection in a switched reluctance (SR) machine having a rotor including a plurality of rotor poles and a stator having a plurality of stator poles, wherein at least one of said rotor and/or said stator has an irregular pole configuration for at least one respective rotor and stator pole, the method comprising:
   sensing a first voltage across a first coil set of a first phase winding associated with at least one of the plurality of stator poles, without introducing a test current into the first phase winding;
   comparing said first voltage to at least one reference value to generate a position output signal indicative of a known rotor position; and
   generating an encoder output signal in accordance with said position output signal to control excitation of the first phase winding.

7. A method according to claim 6, wherein said reference value is a voltage proportional to an excitation voltage for exciting said first phase winding.

8. A method according to claim 6, wherein said reference value is a complementary voltage across a second coil set of the first phase winding.

9. A method according to claim 8, wherein said step of comparing said first voltage to said at least one reference value includes the step of computing a voltage ratio of said first voltage and said complementary voltage.

10. A method according to claim 9, wherein said voltage ratio is used as an index to a look-up table having rotor position data.

11. A method according to claim 8, wherein the sum of said first voltage and said complementary voltage is approximately equal to an excitation voltage applied to the first phase winding.

12. A method according to claim 6, wherein said step of sensing said first voltage across said first coil set includes sampling said first voltage.

13. A method according to claim 6, wherein said step of comparing said first voltage to at least one reference value includes determining whether said first coil set has increasing inductance or decreasing inductance.

14. A method according to claim 6, wherein said at least one reference value is used as an index for a look-up table having rotor position data.

15. A method according to claim 6, wherein said step of generating an encoder output signal includes detecting a transition and alternating a phase-change signal in response to detection of the transition.

16. A method according to claim 15, wherein said phase-change signal is advanced or delayed by a predetermined time period.

17. A method according to claim 16, wherein said phase-change signal is the encoder output signal.

18. A method according to claim 6, wherein said method further comprises:
   sensing a second voltage across a second coil set of a second phase winding associated with one or more stator poles;
   comparing said second voltage to at least one reference value to generate a second position output signal, indicative of a known rotor position;
   generating a second encoder output signal in accordance with said second position output signal to control excitation of the second phase winding.

19. A method according to claim 6, wherein said irregular pole configuration includes an irregularity in a geometric characteristic.

20. A method according to claim 6, wherein said irregular pole configuration is an irregularity in a material property of at least one of the rotor poles or the stator poles.

21. A system of position detection in a switched reluctance (SR) machine having a rotor including a plurality of rotor poles and a stator having a plurality of stator poles, wherein at least one of said rotor and/or said stator has an irregular pole configuration for at least one respective rotor and stator pole, said system comprising:
   sensing means for sensing a first voltage across a first coil set of a first phase winding associated with at least one of the plurality of stator poles, without introducing a test current into the first phase winding;
   comparison means for comparing said first voltage to at least one reference value to generate a position output signal, indicative of a known rotor position; and
   means for generating an encoder output signal in accordance with said position output signal to control excitation of the first phase winding.

22. A system according to claim 21, wherein said reference value is a voltage proportional to an excitation voltage for exciting the first phase winding.

23. A system according to claim 21, wherein said reference value is a complementary voltage across a second coil set of the first phase winding.

24. A system according to claim 23, wherein comparison means includes means for computing a voltage ratio of the first voltage and the complementary voltage.

25. A system according to claim 24, wherein said voltage ratio is used as an index to a look-up table having rotor position data.

26. A system according to claim 23, wherein the sum of said first voltage and said complementary voltage is approximately equal to an excitation voltage applied to the first phase winding.

27. A system according to claim 21, wherein said sensing means includes sampling means for sampling said first voltage.

28. A system according to claim 27, wherein said sampling means includes sample and hold circuitry.

29. A system according to claim 28, wherein said sample and hold circuitry is controlled by a control signal received by a chopping switch.

30. A system according to claim 21, wherein comparison means further comprises means for determining whether said first coil set has increasing inductance or decreasing inductance.

31. A system according to claim 21, wherein said at least one reference voltage is used as an index to a look-up table having rotor position data.

32. A system according to claim 21, wherein said means for generating an encoder output signal includes detection means for detecting a transition and alternating a phase-change signal in response to detection of the transition.

33. A system according to claim 32, wherein said means for generating an encoder output signal includes a time modification means for modifying output of said phase-change signal by a predetermined time period.

34. A system according to claim 33, wherein said phase-change signal is the encoder output signal.

35. A system according to claim 21, wherein said system further comprises:

sensing means for sensing a second voltage across a second coil set of a second phase winding;

comparison means for comparing said second voltage to at least one reference voltage to generate a second position output signal, indicative of a known rotor position; and means for generating a second encoder output signal in accordance with said second position output signal to control excitation of the second phase winding.

36. A system according to claim 21, wherein said irregular pole configuration includes an irregularity in a geometric characteristic.

37. A system according to claim 21, wherein said irregular pole configuration includes an irregularity in a material property of at least one of a stator pole or a rotor pole.

38. A system for position detection in a switched reluctance (SR) machine having a rotor including a plurality of rotor poles and a stator having a plurality of stator poles, wherein at least one of said rotor and said stator has an irregular pole configuration for at least one respective rotor and stator pole, the method comprising:

sensing means for sensing a first voltage across a first coil set of a first phase winding associated with at least one of the plurality of stator poles, without introducing a test current into the first phase winding; and means for determining a rotor position based upon the first voltage, wherein an encoder output signal is derived in accordance with said rotor position.

39. A system according to claim 38, wherein said means for determining the rotor position includes:

means for sensing a second voltage across a second coil set of said first phase winding; and means for comparing said first voltage to said second voltage.

40. A system according to claim 38, wherein said means for determining the rotor position includes:

means for comparing said first voltage to a reference voltage derived from an excitation voltage for exciting the first phase winding.

41. A system according to claim 38, wherein said means for determining the rotor position includes:

means for accessing a lookup table having rotor position data, in accordance with said first voltage.

42. A system according to claim 38, wherein said system further comprises:

means for sensing a second voltage across a first coil set of a second phase winding; and means for determining a second rotor position based upon the second voltage.

43. A method of position detection in a switched reluctance (SR) machine having a rotor including a plurality of rotor poles and a stator having a plurality of stator poles, wherein at least one of said rotor and/or said stator has an irregular pole configuration for at least one respective rotor and stator pole, the method comprising:

sensing a first voltage at a common node where a first pair of coils are joined, wherein the first voltage is indicative of the voltage across a first coil set of a first phase winding, said first coil set including at least one coil, and determining a rotor position in accordance with the first voltage, wherein an encoder output signal is derived in accordance with said rotor position.

44. A method according to claim 43, wherein said step of determining the rotor position includes:

sensing a second voltage at the common node, wherein the second voltage is indicative of the voltage across a second coil set of said first phase winding, said second coil set including at least one coil; and comparing said first voltage to said second voltage.

45. A method according to claim 43, wherein said step of determining the rotor position includes:

sensing a second voltage at a second common node where a second pair of coils are joined, wherein the second voltage is indicative of the voltage across a second coil set of said first phase winding, said second coil set including at least one coil; and comparing said first voltage to said second voltage.

46. A method according to claim 43, wherein said step of determining the rotor position includes:

comparing said first voltage to a reference voltage derived from an excitation voltage for exciting the first phase winding.

47. A method according to claim 43, wherein said step of determining the rotor position includes:

accessing a lookup table having rotor position data, in accordance with said first voltage.

48. A method according to claim 43, wherein said method further comprises:

sensing a third voltage at a common node where a second pair of coils are joined, wherein the third voltage is indicative of the voltage across a first coil set of a second phase winding, said first coil set including at least one coil; and determining a second rotor position based upon the third voltage.

49. A system for position detection in a switched reluctance (SR) machine having a rotor including a plurality of rotor poles and a stator having a plurality of stator poles, wherein at least one of said rotor and/or said stator has an irregular pole configuration for at least one respective rotor and stator pole, the system comprising:

means for sensing a first voltage at a common node where a first pair of coils are joined, wherein the first voltage is indicative of the voltage across a first coil set of a first phase winding, said first coil set including at least one coil, and means for determining a rotor position in accordance with the first voltage, wherein an encoder output signal is derived in accordance with said rotor position.

* * * * *